United States Patent
Masson et al.

(10) Patent No.: US 7,952,223 B2
(45) Date of Patent: May 31, 2011

(54) MICRO-HYBRID DEVICE FOR MOTOR VEHICLE

(75) Inventors: Philippe Masson, Grisy-Suisnes (FR); Michael Chemin, Festigny (FR)

(73) Assignee: Valeo Equipements Electiques Moteur, Creteil Cedex (FR)

( * ) Notice: Subject to any disclaimer, the term of this patent is extended or adjusted under 35 U.S.C. 154(b) by 203 days.

(21) Appl. No.: 12/303,327

(22) PCT Filed: May 14, 2007

(86) PCT No.: PCT/FR2007/051267
§ 371 (c)(1),
(2), (4) Date: Dec. 3, 2008

(87) PCT Pub. No.: WO2008/000981
PCT Pub. Date: Jan. 3, 2008

(65) Prior Publication Data
US 2009/0250999 A1  Oct. 8, 2009

(30) Foreign Application Priority Data
Jun. 28, 2006 (FR) .................................. 06 52685

(51) Int. Cl.
*B60L 1/10* (2006.01)

(52) U.S. Cl. ........................................................ 307/9.1
(58) Field of Classification Search ............... 180/65.24, 180/65.285, 65.29; 307/9.1, 10.1, 19–21
See application file for complete search history.

(56) References Cited

U.S. PATENT DOCUMENTS

| | | | | |
|---|---|---|---|---|
| 5,586,613 | A * | 12/1996 | Ehsani | 180/65.23 |
| 5,924,505 | A * | 7/1999 | Theurillat et al. | 180/65.23 |
| 7,469,760 | B2 * | 12/2008 | Kamen et al. | 180/65.31 |
| 2005/0061561 | A1 | 3/2005 | Leonardi et al. | |

FOREIGN PATENT DOCUMENTS

| | | |
|---|---|---|
| DE | 100 42 414 | 3/2002 |
| EP | 1 241 041 | 9/2002 |
| FR | 2 834 941 | 7/2003 |
| FR | 2 842 144 | 1/2004 |

* cited by examiner

*Primary Examiner* — Albert W Paladini
(74) *Attorney, Agent, or Firm* — Berenato & White, LLC

(57) ABSTRACT

A micro-hybrid method and device for a motor vehicle. The device comprises, in an electrical cascade connection, a rotary electric machine, an AC-to-DC converter and a DC electrical supply bus, the DC electrical supply bus being connected to the AC-to-DC converter and being suitable for being connected to the terminals of an energy storage battery supplying an electrical distribution network of the vehicle. The device also comprises large capacity energy storage means which are mounted in parallel in relation to the cascade connection.

14 Claims, 2 Drawing Sheets

MICRO-HYBRID DEVICE FOR MOTOR VEHICLE

CROSS-REFERENCE TO RELATED APPLICATIONS AND CLAIM TO PRIORITY

Figure 1:
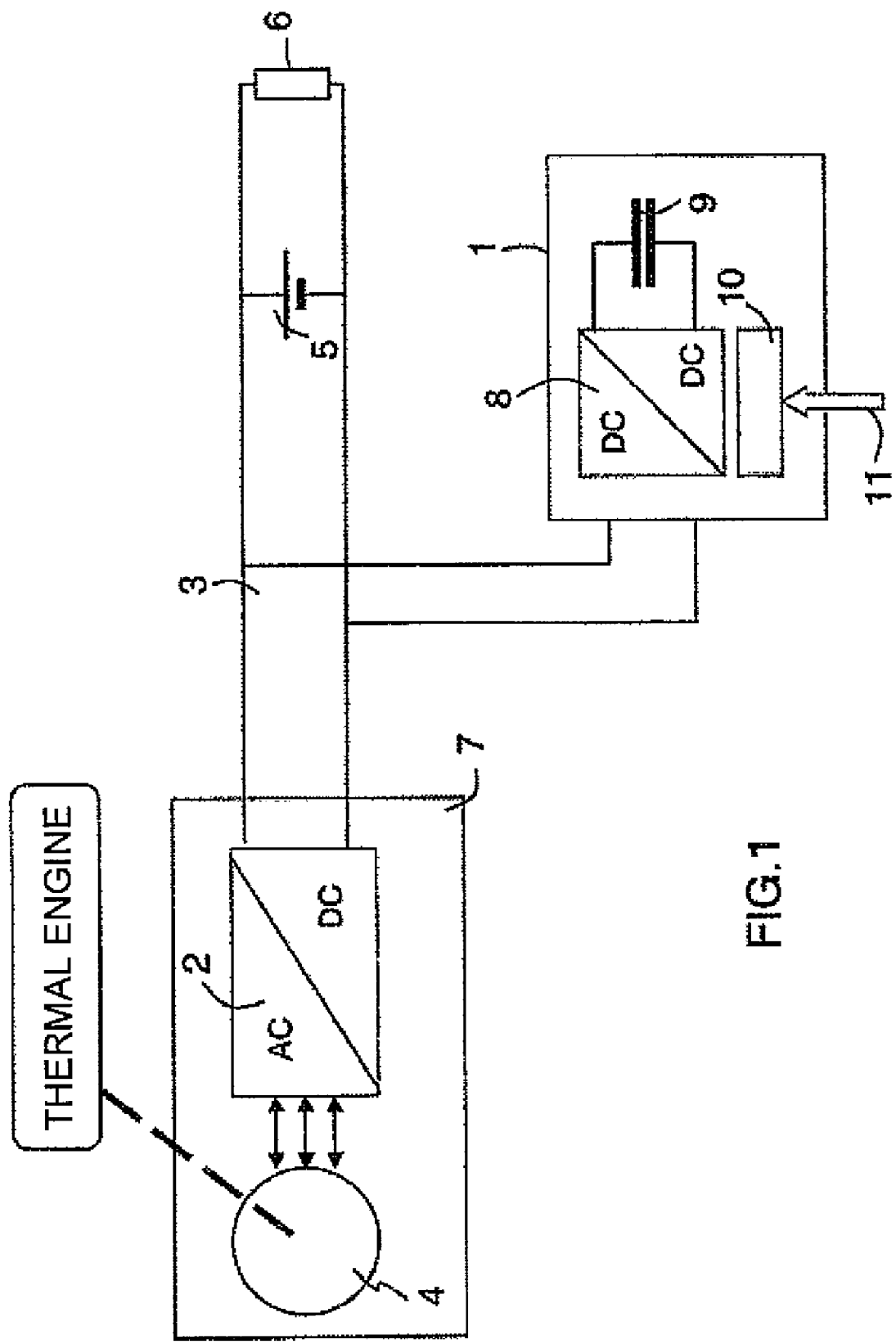

This application relates to International Application No. PCT/FR2007/051267 filed May 14, 2007 and French Patent Application No. 06/52685 filed Jun. 28, 2006, of which the disclosures are incorporated herein by reference and to which priority is claimed.

The present invention can be advantageously applied in the domain of the vehicle sector. Its object is a micro-hybrid device in a motor vehicle. The aim of this micro-hybrid device is, firstly, to recuperate electrical energy during braking phases and, secondly, to restore this energy depending on the consumption of the various items of electrical and electronic equipment contained in the motor vehicle.

When a motor vehicle brakes, kinetic energy is dissipated into the brake discs in the form of heat. There are recuperative braking devices known in the art which recuperate this kinetic energy. Such devices are able to recuperate the kinetic energy produced by the braking of the motor vehicle in order to transform it into electrical energy.

In a motor vehicle, the recuperative braking device is connected to an electrical distribution system of the vehicle which includes a battery for storing this converted electrical energy. This battery is generally a conventional lead battery.

The electrical distribution system restores the energy accumulated in the battery to the various items of electrical and electronic equipment fitted in the motor vehicle. The architecture of the set of components belonging to the electrical distribution system or network on board the vehicle is that of a cascade connection, also referred to in the rest of the description as a series connection.

One problem encountered with this type of architecture is that with a single battery in the distribution system, it is rapidly discharged when all of the items of electrical and electronic equipment are consuming at the same time. This drawback is all the more disadvantageous since these items consume an enormous amount of electrical energy.

A classic solution to this problem consists in increasing the storage capacity of the battery. The physical size of such a battery then becomes very considerable. This solution exhibits a variety of disadvantages, in particular the price, since a battery of this type is relatively expensive, and when fitted it takes up even more room in the engine compartment of the vehicle. Thus the installation of a battery of this type in an environment which is difficult to access will run into problems of handling ability, of weight, of robustness and of cost.

What is more, the batteries used at present are conventional batteries. These batteries cannot be charged with high currents for long enough to ensure a recuperation of the energy produced by the braking device. With this type of device, the management of this transitory energy is not very effective in ensuring a regulation of the voltage circulating in the electrical distribution system of the vehicle.

Another solution consists in equipping the electrical power supply system of the vehicle with a second electrical distribution system with a secondary energy storage device having a storage capacity different from that of the main battery or principal storage device. The second distribution system works alongside the first system which has the main storage device. The second system, with the secondary storage device, delivers a floating DC supply voltage and the first system with the main storage device delivers a low DC supply voltage, generally lower than said floating voltage. A global dual voltage electrical distribution system is thus obtained.

The two storage devices are coupled to each other by means of a reversible DC-DC voltage converter. The function of the converter is to enable transfers of energy between the two storage devices and the distribution systems. An electrical current generator, consisting of an alternator or alternator-starter coupled to the thermal engine of the vehicle, supplies electrical energy directly to the secondary storage device and, through the converter, to the main storage device.

It is known in the art to use a pack of capacitors of very high capacity as a secondary storage device. These very high capacity capacitors are usually known as "supercapacitors" or "super-condensers" by the person skilled in the art. The secondary storage device, which is known as a "supercapacitor" in the rest of the description, has the task of recuperating maximum electrical energy when the electrical current generator is operating in recuperative braking mode.

In relation to a classic lead battery, the number of charge/discharge cycles and their depth are immaterial to the supercapacitor, which also has little constraint with respect to the level of the charging voltage, which can vary to a significant degree.

This type of dual voltage electrical supply system may also take the form of a series architecture. The two storage devices utilised in such a system can provide a better response to the problem of supplying energy to the vehicle.

Nevertheless, an architecture of the dual voltage series type is difficult to fit into the vehicle, because a relatively complex connection system and some large components have to be installed under the bonnet of the vehicle.

It will therefore be observed that the solutions proposed above by the state of the art in response to the problems of storage and supply of energy to all of the items of electrical and electronic equipment are incapable of responding, in particular, to the constraints of space, of weight and above all of cost, and to the particular concerns of specific domains of application, such as the motor vehicle.

There is also an architecture known in the art which is different from the series type architecture commented on above, in which the supercapacitor is connected to a DC power supply system of the vehicle through a reversible DC-DC converter. This type of architecture is known as parallel architecture and has the advantage of simpler connectivity, which facilitates the installation of the micro-hybrid device under the bonnet of the vehicle.

Nowadays, it is desirable to propose solutions involving this parallel architecture so as to expand the design possibilities of micro-hybrid devices.

The object of the present invention is to provide a micro-hybrid device of the parallel type which will permit better exploitation of the performances of the batteries compared with the solutions of prior art.

The motor vehicle according to the invention comprises, in an electrical cascade connection, a rotary electrical machine coupled mechanically to a thermal engine of the vehicle, an AC-DC converter, a DC electrical supply bus, the DC electrical supply bus being connected to the AC-DC converter and being capable of being connected to the terminals of an energy storage battery supplying an electrical distribution system of the vehicle, and the micro-hybrid device comprising a reversible DC-DC converter and large capacity energy storage means which are mounted in parallel with respect to the cascade connection through the reversible DC-DC converter connected to the DC electrical supply bus.

According to the invention, the micro-hybrid device also contains electronic control means which are programmed to assure automatic regulation of the DC electrical supply bus to a constant voltage during the recuperation of energy in the energy storage means or during the restoration of energy by the energy storage means.

According to the invention, the above micro-hybrid device may also include at least one of the following characteristics:

The reversible DC-DC converter is of the switching type.

The large capacity energy storage means comprise a super-capacitor.

The large capacity energy storage means are of the type which are charged by operating at voltages ranging between 12V and 60V.

The large capacity energy storage means are of the type which are charged by operating at voltages ranging between 0V and several hundred volts.

The electronic control means control the operation of the device according to at least one of the following modes:

an autonomous mode of operation in which the control of the device is autonomously defined by the electronic control means, and a driven mode of operation in which the control of the device is defined by the electronic control means depending on at least one piece of information supplied to the device by a system of the vehicle.

The large capacity energy storage means are of the type which charge by operating at voltages ranging between 0V and several hundreds of volts.

At each power cut-off or load demand, the electronic control means regulate the voltage in order to reduce any overvoltages and undervoltages on the electrical distribution system of the vehicle caused by a limited dynamic range of the rotary electrical machine in alternator mode.

The electronic control means control the operation of the device in such a way that an assist current contribution to the battery is triggered automatically during a phase of acceleration or of starting, and this contribution reduces the drop in voltage at the terminals of the battery.

The electronic control means control the operation of the device in such a way as to restore the energy stored in the energy storage means to supply the DC electrical supply bus as a replacement for the rotary electrical machine when the thermal engine is running or stopped.

The electronic control means control the operation of the device in such a way as to supply the energy storage means by the rotary electrical machine in alternator mode when the battery is fully charged but the energy storage means are not fully charged and the thermal engine is not stopped.

The electronic control means control the operation of the device in such a way that when the brake is actuated by the driver, part of the kinetic energy of the vehicle is recuperated and fed to the energy storage means in order to recharge them.

The electronic control means control the operation of the device in such a way that when there is no actuation of the accelerator, nor of the brake, if the thermal engine is not stopped, then the rotary electrical machine in alternator mode powers the electrical distribution system and the battery.

The electronic control means control the operation of the device in such a way that when there is no actuation of the accelerator, nor of the brake, if the thermal engine is stopped, then the energy storage means powers the electrical distribution system and the battery.

The electronic control means control the operation of the device in such a way that when there is no actuation of the accelerator, nor of the brake, if the thermal engine is stopped, then the energy storage means powers the electrical distribution system and the battery.

Figure 2:
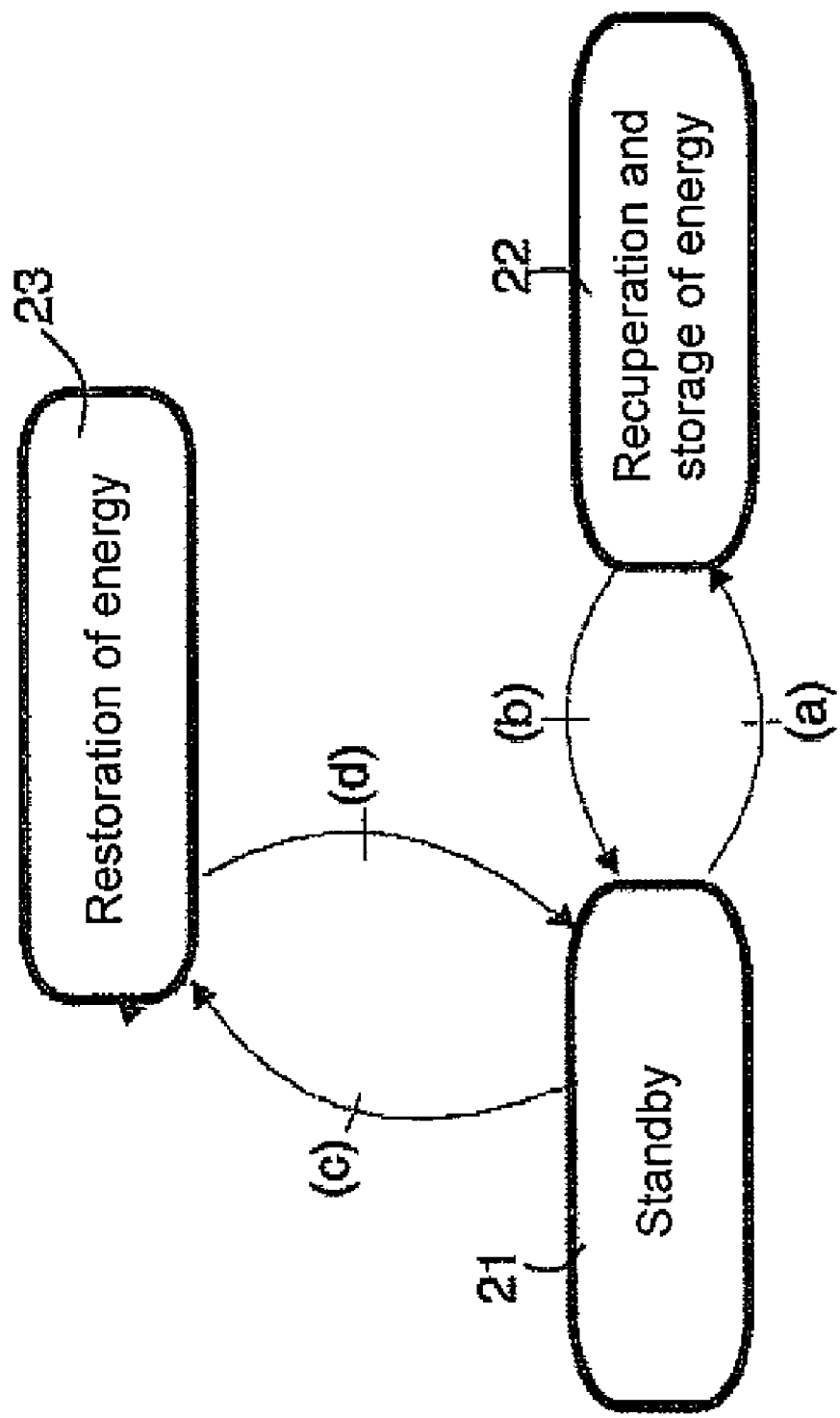

Other characteristics and advantages of the invention will become apparent from reading the detailed description which follows, which will be understood by making reference to the appended drawings, among which:

FIG. 1 is a diagrammatic representation of means implementing one embodiment of the invention; and FIG. 2 is a state diagram showing three modes of operation integral to this embodiment of the invention.

FIG. 1 shows a schematic representation of a device 1 for the recuperation and restoration of electrical energy installed in a motor vehicle, or micro-hybrid device. FIG. 1 shows a voltage generator/electric motor 7 connected to a DC bus 3. The voltage generator/electric motor 7 comprises a polyphase rotary electrical machine 4 coupled mechanically to a thermal engine of the vehicle, more precisely to the crankshaft of the thermal engine, and an AC-DC voltage converter 2. The AC-DC converter 2 is an electrical device which enables a DC voltage to be converted into several alternating voltages, one per phase. The AC-DC converter 2 comprises several bridge arms (not shown). Each bridge arm comprises several electronically-controlled switches. In one preferred example, the AC-DC converter 2 is a triphase inverter-rectifier controlling the rotary machine 4 in electric motor mode.

The DC bus 3 comprises a DC voltage source 5. This voltage source 5, in one preferred example, is a battery or a rectified system. The notion of battery in the present invention should be taken to cover any device forming a rechargeable electrical energy storage means, at the terminals of which a non-zero DC voltage is available, at least in a non-zero charging state of the device.

This voltage source 5 is supplied by the electrical machine 4 via the AC-DC converter 2. The DC bus 3 includes items of electrical or electronic equipment 6. These items of equipment 6 are in particular connecting lines connected in series to the voltage source 5 or electrical consumers connected in parallel to the voltage source 5. The electrical consumers in a motor vehicle can be, inter alia, the headlamps, a radio, an air conditioning system, windscreen wipers, etc.

The electrical machine 4 can be an induction motor or a synchronous machine. The equipment 7 combining the electrical machine 4 and the AC-DC converter 2 can be an alternator or alternator-starter. The design of the reversible alternator-starter is a conventional alternator which offers the option of starting the thermal engine in converter mode and high-efficiency current generation in rectifier mode. In alternator mode, the alternator-starter generates electrical power 15% greater than that obtained via a conventional alternator. In reversible mode, it enables rapid and silent starting of the engine which is entirely managed by electronic means. The alternator-starter is easy to install. It is compatible with the architectures and the power systems of current vehicles.

The device 1 for the recuperation and restoration of electrical energy is connected in parallel to the DC bus 3, at the terminals of the battery 5. It can be connected in simple fashion to absolutely any type of equipment 7 of a motor vehicle. Because it is connected in parallel, this device 1 needs no adaptation system when it is connected to the conventional on-board system of a motor vehicle.

Equally, the device 1 can be installed at different places in the motor vehicle, not necessarily under the bonnet. Thus, the integration of the device 1 into a motor vehicle is flexible. This flexibility of integration allows the constraints of installation in the vehicle to be reduced. In one example, the device 1 can be integrated in the boot of the motor vehicle. The device 1 according to the invention thus resolves the problem of the state of the art of positioning the energy storage means 9 close to the AC-DC converter 2.

In the state of the art, the AC-DC converter 2 and the electrical machine 4 are close together and the battery is, by convention, under the bonnet. This poses firstly the problem of thermal influences contingent upon the length of the cables between the battery and the converter, and secondly, a problem of integrating the device 1, which has a certain volume. The device 1 according to the invention resolves these problems of the state of the art by its flexibility of integration in the motor vehicle. It is thus independent of the various elements of the motor vehicle.

The device 1 of the invention enables the efficiency of the thermal engine of the motor vehicle to be optimised. It thus enables energy to be stored in an energy storage means 9 when it is surplus to requirements, for example in the braking phase, and to restore it when possible, in particular in the acceleration and starting phases, when the thermal engine is stopped, to supply the DC bus 3 or during the alternator phases, with the thermal engine running, to relieve the alternator and thus reduce fuel consumption.

The micro-hybrid device according to the invention comprises, in the case described, a DC-DC converter 8. The converter 8 transforms the power delivered by the alternator at a constant voltage into an equal power at a variable voltage of 0 to 60V, for example. The DC-DC converter in question may have the topology of a parallel chopper. In this case, it supplies an output voltage greater than the input voltage. It is of course understood that the DC-DC converter may correspond to other topologies such as, for example, series chopper or inductive storage. As a series chopper, the converter supplies an output voltage lower than the input voltage. The converter according to the invention is dimensioned depending on the braking power to be recuperated.

The converter 8 is a switching converter capable of absorbing voltage ripples in alternator mode, because its switching frequency and its bandwidth are much greater than the voltage ripples at the terminals of the DC bus 3.

The micro-hybrid device 1 further comprises the energy storage means 9 connected to the converter 8 and a control unit 10, as shown in FIG. 1. The energy storage means 9 is preferably a supercapacitor. The energy storage means 9 can be any other type of energy storage means which enables the invention to be implemented. It is selected to have a voltage greater than 12V. It may advantageously accept up to 60V for low voltage systems and several hundred volts in the systems of hybrid vehicles.

In one preferred example, this energy storage means 9 is a large capacity capacitor, more commonly known by the name of EDLC. This energy storage means 9 is charged during braking. It can be charged to voltages of over 12V. This type of large capacity energy storage means can be charged at high current densities for a short time. For example, in five seconds, this type of energy storage means 9 may enable the storage of energy with the potential to supply several kilowatts, which conventional batteries do not. Conventional batteries do not allow such a great instantaneous flow of power to be accepted.

In alternator-starter mode, the physical size of the energy storage means 9 can be reduced by 20 to 30% in relation to the conventional size of the supercapacitors utilised in a series architecture.

The micro-hybrid device as described enables the electrical energy produced by the equipment 7 to be recuperated, while the converter 8 effects the adaptation of the voltages between the equipment 7 and the energy storage means 9. This electrical energy is then stored in the energy storage means 9.

When the device 1 is operating with an alternator-starter, the energy stored in the energy storage means 9 can be restored, firstly, to start the thermal engine, and secondly, to supply power to the electrical and electronic equipment 6 and to assist the energy source 5 during torque assistance modes (acceleration of the vehicle) of the thermal engine. When the device 1 operates with an alternator, the energy storage means 9 restores its energy to power the equipment 6. Thus, the device 1 according to the invention can be integrated with one or other of the items of equipment of the alternator or alternator-starter type.

The device 1 can be installed in any kind of vehicle, even those for which there is no provision for a 12V supply.

The operation of the micro-hybrid device 1 is controlled by the control unit 10 connected to the reversible DC-DC converter 8. This control unit 10 controls, regulates and restores the energy stored by the energy storage means 9 depending on a voltage measured on the DC bus 3.

The control unit 10 drives the micro-hybrid device according to three operational modes shown in the state diagram in FIG. 2.

The state diagram in FIG. 2 shows the following three modes: a stand-by mode 21, an energy recuperation and storage mode 22 and an energy recuperation mode 23.

The standby mode 21 is the passive, inactive mode.

The energy recuperation and storage mode 22 is triggered when the following condition (a) is true in autonomous mode:

$$U_{bus} > U_{ref} \quad (a)$$

where $U_{bus}$ is the voltage present on the DC bus 3 and $U_{ref}$ is a reference voltage.

In driven mode, the recuperation mode may be inhibited by an external instruction 11 shown in FIG. 1.

The energy recuperation and storage mode 22 is preferably triggered during the braking phases of the vehicle in order to recuperate any energy which would otherwise have been lost into the vehicle's brake discs.

The energy restoration mode 23 is triggered when the following condition (c) is true in autonomous mode:

$$U_{bus} < U_{ref} \quad (c)$$

In driven mode, this mode can be inhibited by the external instruction 11 even if condition (c) is true. This mode is preferably triggered as often as possible in order to utilise the energy which has been recuperated free during braking. The utilisation of this energy relieves the voltage generator/electric motor 7 of the vehicle, thus reducing fuel consumption. This mode is triggered during the following situations in the life of the vehicle:

vehicle acceleration phase,
thermal engine starting phase,
vehicle stop phase,
vehicle rolling phase.

The other conditions (b) and (d) indicated in FIG. 2 are as follows:

(b) $U_{bus} \leq U_{ref}$ or energy storage means 9 fully charged,
(d) $U_{bus} \geq U_{ref}$ or energy storage means 9 fully discharged.

Braking Phase

During the braking phase of the vehicle, the mechanical energy exerted on the shaft of the alternator is transformed into electrical energy. To achieve effective braking, one must be able to recuperate the mechanical energy stored in the shaft of the electric motor as quickly as possible.

When the control unit 10 detects a rise in the voltage of the DC bus 3 of the vehicle, it activates the recuperation mode. The storage means 9 charges until the control unit detects that the storage means 9 is fully charged or that the braking phase has ended.

At the end of this mode, the control unit 10 sets the device 1 to standby mode.

Vehicle Acceleration Phase

When the vehicle is in acceleration mode, the device 1 according to the invention also enables the electrical energy stored in the energy storage means 9 to be supplied in order to give a torque boost to the thermal engine to drive the vehicle.

When the battery 5 is charged, the alternator-starter 4, 7 becomes available as an electric motor. If the driver of the vehicle actuates the accelerator, the micro-hybrid device makes it possible, by means of the control unit and of its particular selection criteria, to decide whether it is possible to actuate the alternator-starter in motor mode, in order to supply, through a belt coupled to the crankshaft, the extra torque demanded by drawing its energy from the energy storage means 9 of the device and from the battery 5.

The end of this energy restoration mode is decided by the device when the energy storage means is fully discharged or when the acceleration phase is ended.

Starting Phase

Here, the operation is analogous to that in the acceleration phase.

The device also plays a role in assisting the battery 5 during this starting phase so as to improve starting performance, but also to limit the drop in voltage of the on-board system (DC bus 3) during this phase of operation. This type of operation is equally valid with a classic starter as with an alternator-starter. The end of this mode can be decided when the energy storage means 9 is fully discharged or when the starting phase ends.

Stop Phase

The stop phase corresponds to a stoppage of the thermal engine, which may be due to the "Stop & Go" operation of the vehicle. These stoppages of the thermal engine correspond to the life phases of the vehicle such as stopping at a red traffic light, at a stop sign, or in a traffic jam.

During this phase, the voltage generator/electric motor 7 is not available, but the electrical equipment of the vehicle must nevertheless be powered. However, the conventional lead battery 5 is unable to tolerate heavy discharges. So it is preferable to use the device in energy restoration mode in order to power the on board system as a replacement for the voltage generator 7 and the battery 5.

The end of this mode will be triggered when the energy storage means 9 is fully discharged or when the stop phase comes to an end.

Vehicle Rolling Phase

In alternator mode, the thermal engine of the vehicle produces mechanical energy on the belt driving the shaft of the alternator, which is a synchronous machine. The alternator provides electrical energy. This electrical energy is utilised to supply the classic battery and the current-consuming equipment.

During this phase, the device can be used in the following modes of operation: recharging the energy storage means 9 or restitution of energy.

For a global optimisation of fuel consumption, it is preferable to use the device 1 in energy restoration mode to supplement the voltage generator 7, in order to supply the electric load consumers 6. This allows the torque drawn from the crankshaft by the electrical machine 4 to be limited and thus reduces current consumption.

The device 1 also acts as an active voltage filter at the terminals of the DC bus to reduce the current ripple generated by the alternator. The micro-hybrid device constituted by the invention can be activated in one mode or the other at each power cut-off or load demand to reduce any overvoltages and/or undervoltages on said DC bus, overvoltages and/or undervoltages to which the alternator is unable to respond because of its small bandwidth.

The invention claimed is:

1. A micro-hybrid device (1) for recuperation and restitution of electrical energy in a motor vehicle;
    said micro-hybrid device (1) adapted to be mounted in parallel in relation to an electrical cascade connection of a rotary electrical machine (4) mechanically coupled to a thermal engine of said vehicle, an AC-DC converter (2) and a DC power supply bus (3), said DC power supply bus (3) being connected to said AC-DC converter (2) and capable of being connected to terminals of an energy storage battery (5) powering an electrical distribution system of said vehicle;
    said micro-hybrid device (1) comprising:
    large capacity energy storage means (9);
    a reversible DC-DC converter (8), said large capacity energy storage means (9) being connected to said DC power supply bus (3) via said reversible DC-DC converter (8); and
    electronic control means (10) connected to said reversible DC-DC converter (8) and programmed to ensure, depending on a voltage measured on the DC power supply bus (3), an automatic regulation of the DC power supply bus (3) to a constant voltage during one of the recuperation of energy in said large capacity energy storage means (9) and the restitution of energy by said large capacity energy storage means (9);
    said electronic control means (10) controlling the operation of said micro-hybrid device according to at least one of the following modes:
    an autonomous mode of operation in which control of said micro-hybrid device being defined autonomously by said electronic control means (10), and
    a driven mode of operation in which control of said micro-hybrid device being defined by said electronic control means (10) depending on at least one piece of information (11) supplied to said micro-hybrid device by a system of said vehicle.

2. The device according to claim 1, wherein said reversible DC-DC converter (8) is of the switching type.

3. The micro-hybrid device according to claim 1, wherein said large capacity energy storage means (9) consist of a supercapacitor (9).

4. The micro-hybrid device according to claim 1, wherein said large capacity energy storage means (9) are of the type which charges while operating at voltages ranging between 12V and 60V.

5. The micro-hybrid device according to claim 1, wherein said large capacity energy storage means (9) are of the type which charge while operating at voltages ranging between 0V and several hundred volts.

6. The micro-hybrid device according to claim 1, wherein the rotary electrical machine is an alternator (4).

7. The micro-hybrid device according to claim 1, wherein the rotary electrical machine is an alternator-starter (4).

8. The micro-hybrid device according to claim 1, wherein said electronic control means (10) control the operation of the device in such a way that at each power cut-off or load demand, said electronic control means (10) regulate the voltage to reduce any overvoltages and undervoltages on the electrical distribution system of the vehicle caused by a limited dynamic range of the rotary electrical machine (4) in alternator mode.

9. The micro-hybrid device according to claim 8, wherein said electronic control means (10) control an operation of the device in such a way that an assist current contribution to the battery (5) is triggered automatically during a phase of acceleration or of starting, said assist current contribution reducing the drop in voltage at the terminals of the battery (5).

10. The micro-hybrid device according to claim 8, wherein said electronic control means (10) control the operation of the device in such a way as to restore the energy stored in the energy storage means (9) to supply the DC electrical supply bus (3) as a replacement for the rotary electrical machine (4) when the thermal engine is running or stopped.

11. The micro-hybrid device according to claim 8, wherein said electronic control means (10) control the operation of the device in such a way as to supply the energy storage means (9) by the rotary electrical machine (4) in alternator mode when the battery (5) is fully charged but the energy storage means (9) are not fully charged and the thermal engine is not stopped.

12. The micro-hybrid device according to claim 8, wherein said electronic control means (10) control the operation of the device in such a way that when the brake is actuated by the driver, part of the kinetic energy of the vehicle is recuperated and fed to the energy storage means (9) in order to recharge them fully.

13. The micro-hybrid device according to claim 8, wherein said electronic control means (10) control the operation of the device in such a way that when there is no actuation of the accelerator, nor of the brake, if the thermal engine is not stopped, then the rotary electrical machine (4) in alternator mode powers the electrical distribution system and the battery (5).

14. The micro-hybrid device according to claim 8, wherein said electronic control means (10) control the operation of the device in such a way that when there is no actuation of the accelerator, nor of the brake, if the thermal engine is stopped, then the energy storage means (9) power the electrical distribution system and the battery (5).

* * * * *